United States Patent
Inokawa

(10) Patent No.: US 8,520,039 B2
(45) Date of Patent: Aug. 27, 2013

(54) IMAGE-SIGNAL PROCESSING DEVICE, IMAGE-SIGNAL PROCESSING METHOD, AND IMAGE DISPLAY APPARATUS

(75) Inventor: Hiroyuki Inokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 12/871,332

(22) Filed: Aug. 30, 2010

(65) Prior Publication Data

US 2011/0057970 A1 Mar. 10, 2011

(30) Foreign Application Priority Data

Sep. 10, 2009 (JP) ................... 2009-209039

(51) Int. Cl.
  *G09G 5/02* (2006.01)
  *G09G 5/08* (2006.01)
(52) U.S. Cl.
  USPC .......................... 345/698; 345/158
(58) Field of Classification Search
  USPC ......................... 345/698; 382/299
  See application file for complete search history.

(56) References Cited

U.S. PATENT DOCUMENTS

2005/0265459 A1* 12/2005 Bhattacharjya et al. . 375/240.24
2008/0137751 A1* 6/2008 Roman ..................... 375/240.21

FOREIGN PATENT DOCUMENTS

JP 2005-354187 12/2005

* cited by examiner

*Primary Examiner* — Michael Faragalla
(74) *Attorney, Agent, or Firm* — Oblon, Spivak, McClelland, Maier & Neustadt, L.L.P.

(57) ABSTRACT

An image-signal processing device includes an image-enlargement processing unit that generates image signals representing an image which has been enlarged by repeating pixels; a pattern-data output unit that outputs, for each of repetition areas which are obtained by repeating the pixels, a pattern data item in accordance with signals which are obtained by removing signals corresponding to a predetermined number of upper bits from a corresponding one of the image signals, the pattern data item being used to reproduce, in the pixels included in the repetition area, gradation based on the signals that are obtained by removing the signals corresponding to the predetermined number of upper bits from the image signal; and an addition unit that adds, for the repetition area, the pattern data item to the signals corresponding to the predetermined number of upper bits included in the image signal.

7 Claims, 9 Drawing Sheets

FIG. 6

| SP [1] | SP [0] | TABLE | | | |
|---|---|---|---|---|---|
| | | TB1 | TB2 | TB3 | TB4 |
| 0 | 0 | 0 | 0 | 0 | 0 |
| 0 | 1 | 1 | 0 | 0 | 0 |
| 1 | 0 | 1 | 0 | 0 | 1 |
| 1 | 1 | 1 | 1 | 1 | 0 |

IMAGE-SIGNAL PROCESSING DEVICE, IMAGE-SIGNAL PROCESSING METHOD, AND IMAGE DISPLAY APPARATUS

BACKGROUND OF THE INVENTION

1. Field of the Invention

The present invention relates to an image-signal processing device, an image-signal processing method, and an image display apparatus, in particular, which are capable of achieving wide gradation expression when enlarged display is performed.

2. Description of the Related Art

Hitherto, an increase in the resolution of image display apparatuses has been achieved. For example, the resolution of image display apparatuses is increased from a high definition (HD) size of 1920×1080 pixels to a 4K2K size of 3840×2160 pixels. On the other hand, image signals are mainly generated for the HD size. When the image display apparatuses having a resolution that has been increased are used, scalers or the like are generally used as described in Japanese Unexamined Patent Application Publication No. 2005-354187.

Furthermore, an increase in the number of bits in a case of generation of image signals or image processing has been achieved. In a case of generation of image signals, for example, generation of ten-bit or twelve-bit image signals has been performed. Additionally, in a case of image processing, for example, conversion of a bit depth is performed so that eight-bit image signals are converted into ten-bit image signals. Using the image signals that are obtained by conversion, brightness correction, color correction, correction of gradation characteristics, and so forth are performed.

SUMMARY OF THE INVENTION

In such an image display apparatus, not only an increase in the resolution of a display device has been achieved, but also the gradation has been increased. However, the image display apparatus does not necessarily satisfy gradation characteristics that are suitable for image signals in which the number of bits has been increased. Accordingly, when the gradation characteristics of the image display apparatus are not suitable for the image signals, signals corresponding to a predetermined number of upper bits that are suitable for the gradation characteristics of the image display apparatus are extracted from each of the image signals to obtain an extracted image signal. The display device is driven on the basis of the extracted image signals. For example, in a case in which the image signals are ten-bit image signals and in which the display device has gradation characteristics suitable for eight-bit image signals, signals corresponding to upper eight bits are extracted from each of the ten-bit image signals to obtain an eight-bit image signal. The display device is driven on the basis of the eight-bit image signals. Thus, it is difficult for the image display apparatus to achieve wide gradation expression.

For this reason, the present invention provides an image-signal processing device, an image-signal processing method, and an image display apparatus that are capable of achieving wide gradation expression when enlarged display is performed.

According to a first embodiment of the present invention, there is provided an image-signal processing device including the following elements: an image-enlargement processing unit configured to generate image signals representing an image that has been enlarged by repeating pixels; a pattern-data output unit configured to output, for each of repetition areas that are obtained by repeating the pixels, a pattern data item in accordance with signals that are obtained by removing signals corresponding to a predetermined number of upper bits from a corresponding one of the image signals, the pattern data item being used to reproduce, in the pixels included in the repetition area, gradation based on the signals that are obtained by removing the signals corresponding to the predetermined number of upper bits from the image signal; and an addition unit configured to add, for each of the repetition areas, the pattern data item to the signals corresponding to the predetermined number of upper bits included in a corresponding one of the image signals to obtain a signal, and configured to output the obtained signal.

In the embodiment of the present invention, pixels are repeated, for example, thereby enlarging an input image to the size of a display image. Furthermore, signals corresponding to the predetermined number of upper bits are generated from each of image signals representing the input image, thereby converting the image signal into a predetermined-number-of-bits image signal, the predetermined number of bits being suitable for the gradation characteristics of an image display apparatus. Additionally, a pattern data item used to reproduce gradation based on signals that are obtained by removing from the signals corresponding to the predetermined number of upper bits from each of the image signals representing the input image, for example, used for dithering, is output to the addition unit in accordance with the signals that are obtained by removing from the signals corresponding to the predetermined number of upper bits from the image signal. The pattern data item is added to the signals corresponding to the predetermined-number of upper bits of each of the pixels included in each of the repetition areas in which the pixels are repeated. Furthermore, the pattern-data output unit has a table for each of the pixels included in the repetition area. The pattern data item is selected from the table in accordance with the signals that are obtained by removing the signals corresponding to the predetermined number of upper bits that are extracted from the image signal, and output. Moreover, a plurality of pattern data items are stored in advance. Switching between the pattern data items is performed in a spatial direction or a time direction. Furthermore, when the number of bits corresponding to the signals that are obtained by removing the signals corresponding to the predetermined number of upper bits from the image signal is m, the number of pixels included in the repetition area is set to "$2^m$" or more. Additionally, when the number of pixels included in the repetition area is "$2^m$", the pattern data is output in accordance with signals corresponding to upper n bits that are included in the signals which are obtained by removing the signals corresponding to the predetermined number of upper bits from the image signal.

According to a second embodiment of the present invention, there is provided an image-signal processing method including the steps of: generating, with an image-enlargement processing unit, image signals representing an image that has been enlarged by repeating pixels; outputting, with a pattern-data output unit, for each of repetition areas that are obtained by repeating the pixels, a pattern data item in accordance with signals that are obtained by removing signals corresponding to a predetermined number of upper bits from a corresponding one of the image signals, the pattern data item being used to reproduce, in the pixels included in the repetition area, gradation based on the signals that are obtained by removing the signals corresponding to the predetermined number of upper bits from the image signal; and adding, with an addition unit, for each of the repetition areas, the pattern data item to the signals corresponding to the predetermined number of upper bits included in a corresponding one of the image signals to obtain a signal, and configured to output the obtained signal.

Furthermore, according to a third embodiment of the present invention, there is provided an image display apparatus including the following elements: a display unit configured to perform image display using image signals, the image signals being predetermined-number-of-bits image signals; an image-enlargement processing unit configured to generate the image signals suitable for a display resolution of the display unit by repeating pixels; a pattern-data output unit configured to output, for each of repetition areas that are obtained by repeating the pixels, a pattern data item used to reproduce, in the pixels included in the repetition area, gradation based on signals that are obtained by removing signals corresponding to a predetermined number of upper bits from a corresponding one of the image signals; and an addition unit configured to add, for each of the repetition areas, the pattern data item to the signals corresponding to the predetermined number of upper bits included in a corresponding one of the image signals to obtain a signal, and configured to output the obtained signal to the display unit.

In the embodiments of the present invention, pixels are repeated, thereby enlarging an input image to a size based on the number of display pixels of the display unit. Furthermore, signals corresponding to the predetermined number of upper bits are generated from each of image signals representing the input image, thereby converting the image signal into a predetermined-number-of-bits image signal, the predetermined number of bits being suitable for the gradation characteristics of the display unit. Additionally, a pattern data item used to reproduce gradation based on signals that are obtained by removing from the signals corresponding to the predetermined number of upper bits from each of the image signals representing the input image, for example, used for dithering, is output to the addition unit in accordance with the signals that are obtained by removing from the signals corresponding to the predetermined number of upper bits from the image signal. The pattern data item is added to the signals corresponding to the predetermined-number of upper bits of each of the pixels included in each of the repetition areas in which the pixels are repeated, thereby obtaining the predetermined-number-of-bits image signal. Image display is performed by the display unit on the basis of the predetermined-number-of-bits image signals.

According to the embodiments of the present invention, image signals representing an enlarged image that is obtained by repeating pixels are generated by the image-enlargement processing unit. Furthermore, for each of the repetition areas in which the pixels are repeated, a pattern data item is output from the pattern-data output unit in accordance with signals that are obtained by removing signals corresponding to the predetermined number of upper bits from a corresponding one of the image signals representing the enlarged image. The pattern data item is used to reproduce, in the pixels included in the repetition area, gradation based on the signals that are obtained by removing the signals corresponding to the predetermined number of upper bits from the image signal. Additionally, the pattern data item that has been output is added by the addition unit to the signals corresponding to the predetermined number of upper bits included in a corresponding one of the image signals representing the enlarged image. Accordingly, even when the bit depth of the image signals is reduced, enlarged display with wide gradation expression can be performed.

BRIEF DESCRIPTION OF THE DRAWINGS

FIG. 6 is a diagram for explaining a pattern-data output unit;

DESCRIPTION OF THE PREFERRED EMBODIMENTS

Figure 1:
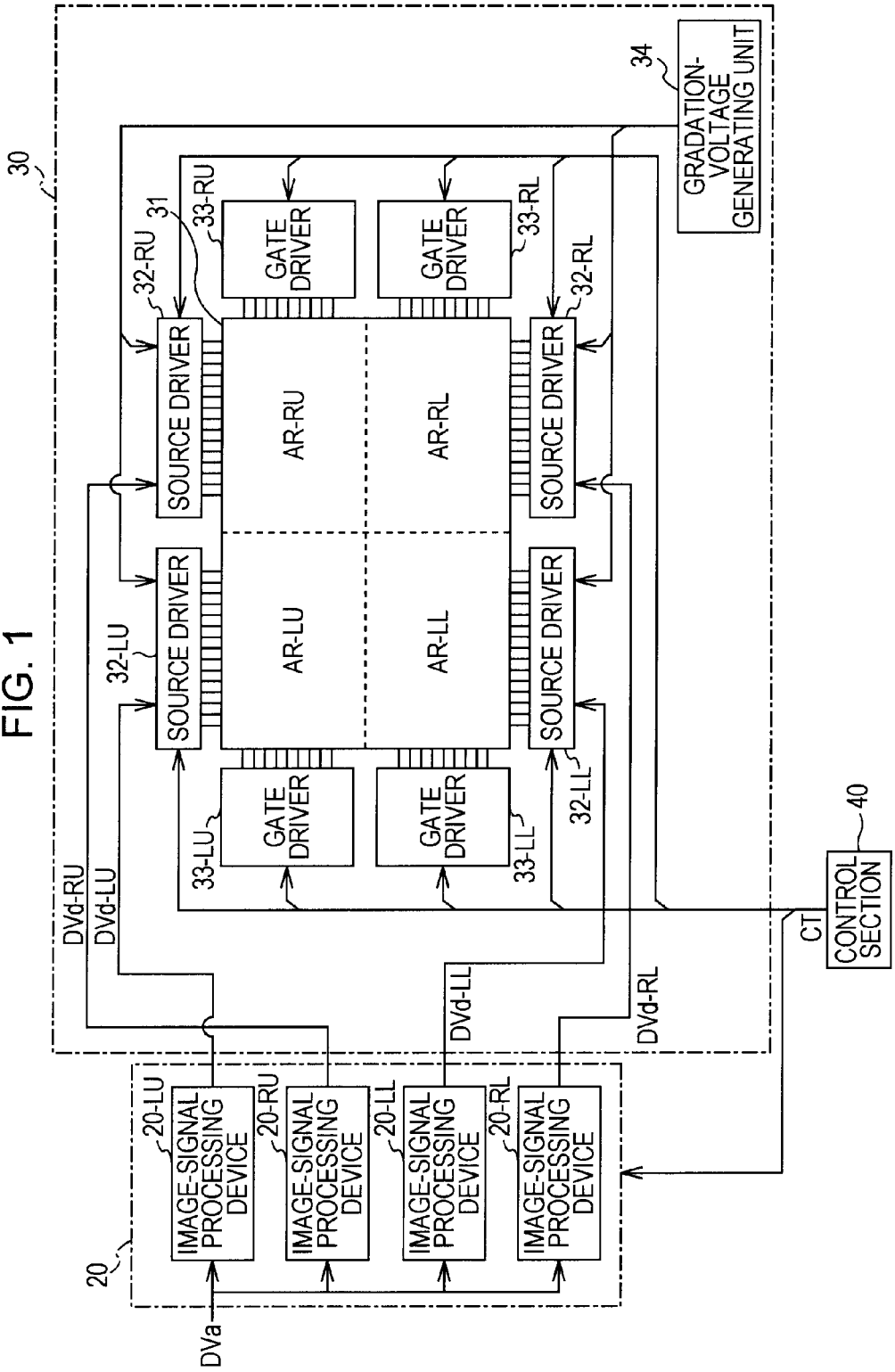
FIG. 1 is a diagram of a configuration of an image display apparatus including an image-signal processing device.

Hereinafter, embodiments of the present invention will be described. Note that the order of section headings in the description is as follows:
1. Configuration of Image Display Apparatus Including Image-Signal Processing Device
2. Operation of Image-Signal Processing Device
1. Configuration of Image Display Apparatus Including Image-Signal Processing Device FIG. 1 illustrates an example of a configuration of an image display apparatus including an image-signal processing device according to an embodiment of the present invention. The image display apparatus includes an image-signal processing device 20 and a display section 30. Note that, in the description given below, it is supposed that image signals DVa which are input to the image-signal processing device 20 are image signals whose bit depth is ten bits and which are generated for the HD size of 1920×1080 pixels. Furthermore, the display section 30 has gradation characteristics suitable for image signals whose bit depth is eight bits, and the number of pixels included in the display section 30 is 3840×2160 (the 4K2K size) that is four times the HD size.

The image-signal processing device 20 converts the image signals DVa representing an input image into image signals whose bit depth is suitable for the gradation characteristics of the display section 30. Furthermore, the image-signal processing device 20 enlarges the input image in accordance with the resolution of the display section 30. Additionally, the image-signal processing device 20 performs multiple-gradation processing so that wide gradation expression is achieved in the enlarged image even when conversion of the bit depth is performed.

Here, in a case in which the input image having the HD size is enlarged and displayed in the 4K2K size, it is necessary that the image-signal processing device 20 have a high processing capability. Accordingly, the input image is divided into images, and each of the divided images is processed by a corresponding one of image-signal processing devices, thereby realizing image display in the 4K2K size without using an image-signal processing device having a high performance capability. Note that FIG. 1 illustrates a configuration of the image display apparatus in a case in which the input image is divided into four images and in which the images are processed, and four image-signal processing devices 20-LU, 20-RU, 20-LL, and 20-RL are used as the image-signal processing device 20.

Figure 2:
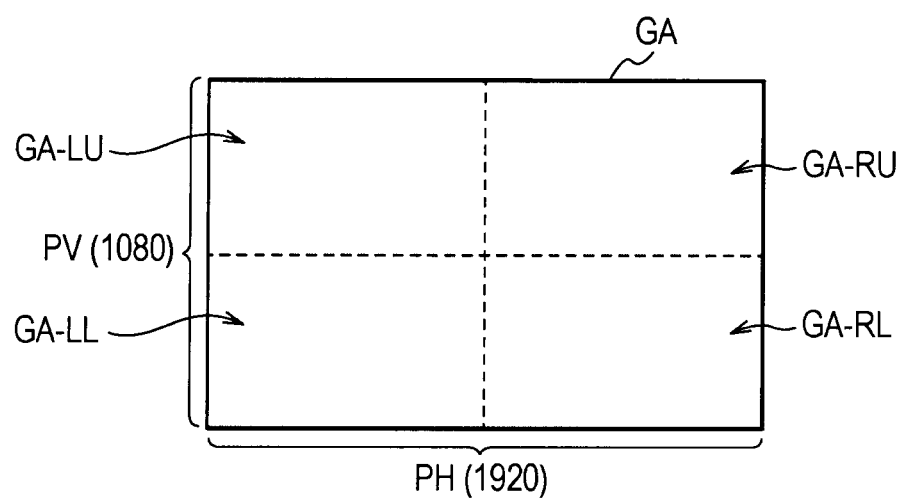
FIG. 2 is a diagram of an input image.

The image-signal processing device 20-LU performs a process of doubling the number of pixels in each of the vertical and horizontal directions for the image signals representing one of quarter areas of the input image having the HD size to generate image signals representing an image that is obtained by enlarging an image which is the quarter area of the input image to the HD size. Similarly, the individual image-signal processing devices 20-RU, 20-LL, and 20-RL generate image signals of images that are obtained by enlarging images which are the other different quarter areas of the input image to the HD size. For example, an input image GA that is illustrated in FIG. 2 has the HD size (the number PH of pixels in the horizontal direction is 1920 and the number PV of pixels in the vertical direction is 1080). The image-signal processing device 20-LU generates image signals representing an enlarged image that is obtained by enlarging an image GA-LU which is the upper-left quarter area of the input image GA to the HD size. Furthermore, the image-signal processing device 20-RU generates image signals representing an enlarged image that is obtained by enlarging an image GA-RU which is the upper-right quarter area of the input image GA to the HD size. The image-signal processing device 20-LL generates image signals representing an enlarged image that is obtained by enlarging an image GA-LL which is the lower-left quarter area of the input image GA to the HD size. Additionally, the image-signal processing device 20-RL generates image signals representing an image that is obtained by enlarging an image GA-RL which is the lower-right quarter area of the input image GA to the HD size.

Furthermore, the image-signal processing device 20-LU extracts a portion, which corresponds to the upper eight bits, of each of the image signals which represent the enlarged image and whose bit depth is ten bits to convert the image signal into an image signal whose bit depth is eight bits. Similarly, each of the image-signal processing devices 20-RU, 20-LL, and 20-RL extracts a portion, which corresponds to the upper eight bits, of each of the image signals which represent a corresponding one of the enlarged images and whose bit depth is ten bits to convert the image signal into an image signal whose bit depth is eight bits.

Additionally, the image-signal processing device 20-LU performs multiple-gradation processing, with which deterioration in the gradation that has been caused by reducing the bit depth from ten bits to eight bits can be compensated for, on the image signals whose bit depth is eight bits. The image-signal processing device 20-LU outputs image signals DVd-LU in which enlargement of the image and deterioration in the gradation have been compensated for. Similarly, the image-signal processing devices 20-RU, 20-LL, and 20-RL output image signals DVd-RU, DVd-LL, and DVd-RL, in which enlargement of the image and deterioration in the gradation have been compensated for, respectively.

Figure 3:
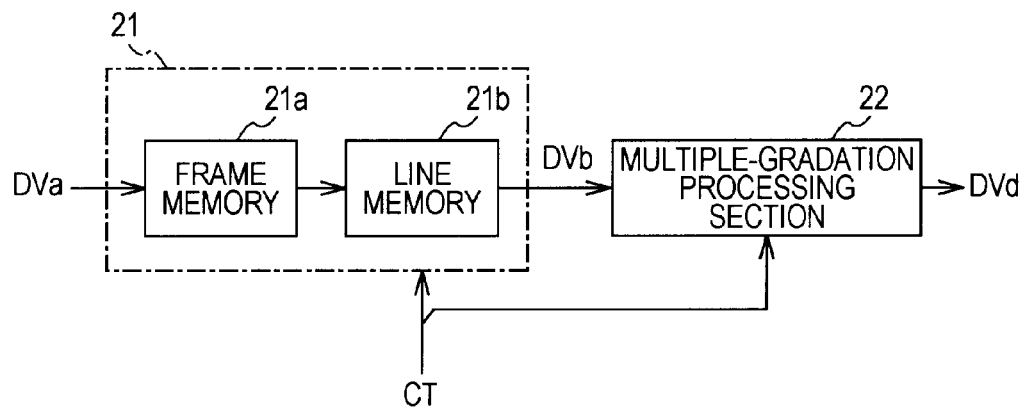
FIG. 3 is a diagram of a configuration of the image-signal processing device.

FIG. 3 illustrates a configuration of the image-signal processing device. Each of the image-signal processing devices 20-LU, 20-RU, 20-LL, and 20-RL has an image-enlargement processing section 21 and a multiple-gradation processing section 22.

The image-enlargement processing section 21 has a frame memory 21a and a line memory 21b. The frame memory 21a stores the image signals representing one of the quarter areas of the input image GA. The line memory 21b stores the image signals, for one line, that are read from the frame memory 21a. The operations of the frame memory 21a and the line memory 21b are controlled using control signals CT that are supplied from a control section 40, which is described below.

The image-enlargement processing section 21 writes/reads the image signals in accordance with the control signals CT that are supplied from the control section 40. The image-enlargement processing section 21 generates image signals DVb representing an image that is obtained by doubling an image which is the quarter area of the input image in each of the horizontal and vertical directions, and outputs the image signals DVb to the multiple-gradation processing section 22.

The multiple-gradation processing section 22 converts the image signals DVb, which have been supplied from the image-enlargement processing section 21, into image signals whose bit depth is suitable for the gradation characteristics of the display section 30. For example, it is supposed that the bit depth of the image signals DVb is ten bits and the gradation characteristics of the display section 30 are characteristics that are suitable for image signals whose bit depth is eight bits. In this case, the multiple-gradation processing section 22 extracts a portion, which corresponds the upper eight bits, of each of the image signals DVb, to obtain an image signal DVc whose bit depth is eight bits.

Furthermore, the multiple-gradation processing section 22 performs multiple gradation processing so that wide gradation expression can be realized in an enlarged image even when conversion of the bit depth is performed. Here, when the image that is the quarter area of the input image is doubled in each of the vertical and horizontal directions, each of the pixels of the image that is the quarter area of the input image is repeated twice in each of the horizontal and vertical directions. The pixel corresponds to a repetition area, in which four pixels that are obtained by repeating the pixel are included, of the enlarged image. Accordingly, for each of repetition areas that are obtained in units of four pixels by repeating each of the pixels of the input image, the multiple-gradation processing section 22 adjusts signal levels of the pixels included in the repetition area, thereby compensating for deterioration in the gradation that has been caused by reducing the bit depth from ten bits to eight bits.

Figure 4:
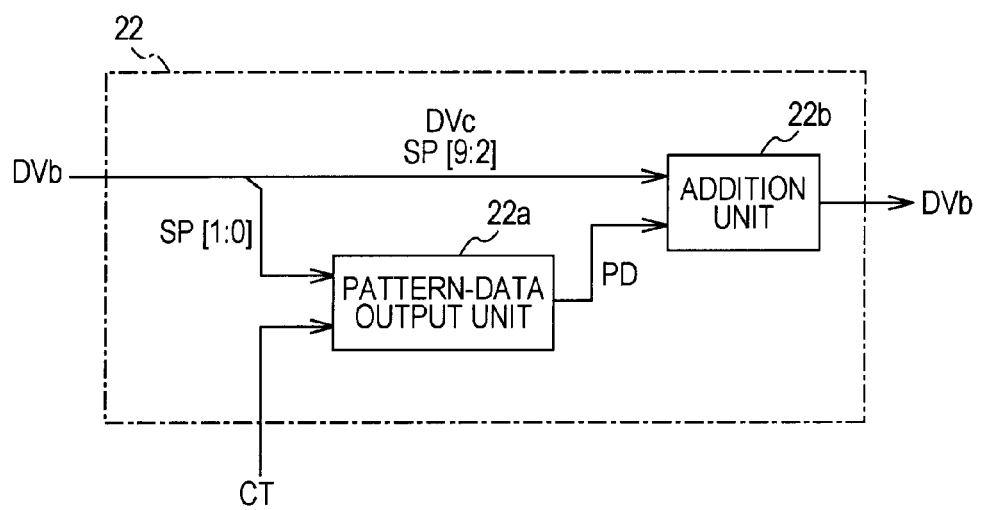
FIG. 4 is a diagram of a configuration of a multiple-gradation processing section.

FIG. 4 illustrates a configuration of the multiple-gradation processing section 22. The multiple-gradation processing section 22 includes a pattern-data output unit 22a and an addition unit 22b.

In order to reproduce, using dithering, gradation based on bit signals that are no longer used in the image signal DVc because of conversion of the bit depth, the pattern-data output unit 22a outputs a pattern data item in accordance with the bit signals that are no longer used in the image signal DVc.

The pattern-data output unit 22a stores, in advance, tables in which pattern data items used for dithering are listed and each of which is provided for a corresponding one of the pixels included in the repetition area. The pattern-data output unit 22a selects one of the pattern data items listed in the tables in accordance with the bit signals that are not used in the image signal DVc because of conversion of the bit depth and in accordance with whether a pixel currently being processed is the first pixel, the second pixel, the third pixel, or the fourth pixel included in the repetition area. The pattern-data output unit 22a outputs the selected pattern data item to the addition unit 22b. In other words, the pattern-data output unit 22a selects one of the tables in accordance with whether a pixel currently being processed is the first pixel, the second pixel, the third pixel, or the fourth pixel included in the repetition area. The pattern-data output unit 22a selects one of the pattern data items from the selected table in accordance with signals corresponding to lower two bits of the corresponding ten-bit image signal DVb, i.e., lower two bit signals SP[1:0], and outputs the selected pattern data item. The addition unit 22b adds the pattern data item, which has been output from the pattern-data output unit 22a, to signals corresponding to upper eight bits of the ten-bit image signal DVb, i.e., upper eight bit signals SP[9:2], to obtain an image signal DVd, and outputs the image signal DVd.

In this manner, the multiple-gradation processing section 22 considers, as an error, signal levels of the lower two bit signals SP[1:0] that are not used in the image signal DVc. Furthermore, the multiple-gradation processing section 22 performs error distribution in which the error is distributed to the four pixels included in the repetition area, and generates the image signal DVd in which deterioration in the gradation that has been caused by reducing the bit depth from ten bits to eight bits is compensated for.

Figure 5:
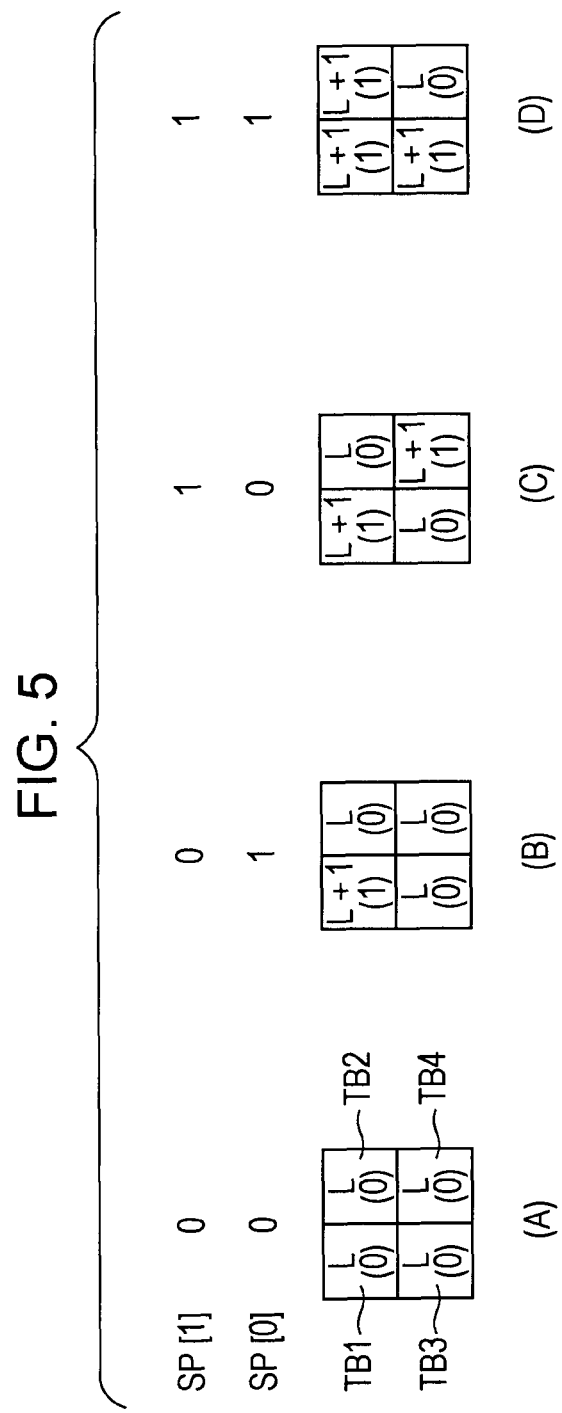
FIG. 5 includes diagrams for explaining multiple-gradation processing.

FIG. 5 illustrates an example of dithering. Note that it is supposed that a gradation level which is represented by the upper eight bit signals SP[9:2] is, for example, "L", and it is supposed that a gradation level which is obtained in a case in which "1" is added to the gradation level represented by the upper eight bit signals SP[9:2] is, for example, "L+1".

As illustrated in part (A) of FIG. 5, in a case in which the lower two bit signals SP[1:0] of one of the ten-bit image signals DVb are "0", even when the ten-bit image signal DVb is converted into an eight-bit image signal by extracting the upper eight bit signals SP[9:2] from the ten-bit image signal DVb, the gradation level does not change. Accordingly, when the four pixels included in the repetition area are pixels having the lower two bit signals SP[1:0] of "0", the gradation level of each of the four pixels is set to "L".

As illustrated in part (B) of FIG. 5, when the bit signal SP[1] is "0" and the bit signal SP[0] is "1", a gradation level based on an image signal that is obtained by extracting the upper eight bit signals SP[9:2] from the ten-bit image signal DVb is "0.25" lower than a gradation level based on the ten-bit image signal DVb. Accordingly, when the four pixels included in the repetition area are pixels having the bit signal SP[1] of "0" and the bit signal SP[0] of "1", the gradation level of one of the four pixels is set to "L+1", whereby the average of the gradation levels of the four pixels included in the repetition area becomes "L+0.25". Thus, the reduction in the gradation level can be compensated for.

As illustrated in part (C) of FIG. 5, when the bit signal SP[1] is "1" and the bit signal SP[0] is "0", a gradation level based on an image signal that is obtained by extracting the upper eight bit signals SP[9:2] from the ten-bit image signal DVb is "0.5" lower than a gradation level based on the ten-bit image signal DVb. Accordingly, when the four pixels included in the repetition area are pixels having the bit signal SP[1] of "1" and the bit signal SP[0] of "0", the gradation levels of two of the four pixels are set to "L+1", whereby the average of the gradation levels of the four pixels included in the repetition area becomes "L+0.5". Thus, the reduction in the gradation level can be compensated for.

As illustrated in part (D) of FIG. 5, when the bit signal SP[1] is "1" and the bit signal SP[0] is "1", a gradation level based on an image signal that is obtained by extracting the upper eight bit signals SP[9:2] from the ten-bit image signal DVb is "0.75" lower than a gradation level based on the ten-bit image signal DVb. Accordingly, when the four pixels included in the repetition area are pixels having the bit signal SP[1] of "1" and the bit signal SP[0] of "1", the gradation levels of three of the four pixels are set to "L+1", whereby the average of the gradation levels of the four pixels included in the repetition area becomes "L+0.75". Thus, the reduction in the gradation level can be compensated for.

The tables stored in the pattern-data output unit 22a are set in advance, as illustrated in parts (A) to (D) of FIG. 5 and FIG. 6, so that, when the ten-bit image signals DVb are converted into the eight-bit image signals DVc, a reduction in the gradation that is caused by the conversion of the bit depth can be compensated for.

Here, data items listed in a table TB1 are pattern data items for the first pixel included in the repetition area. Furthermore, data items listed in a table TB2 are pattern data items for the second pixel included in the repetition area. Data items listed in a table TB3 are pattern data items for the third pixel included in the repetition area. Moreover, data items listed in a table TB4 are pattern data items for the fourth pixel included in the repetition area.

When the bit signal SP[1] is zero and the bit signal SP[0] is zero, "0", "0", "0", and "0" are sequentially supplied to the addition unit 22b as pattern data items PD for signals of the four pixels included in the repetition area. Accordingly, regarding an image based on the image signals DVd that are output from the addition unit 22b, the gradation levels of the first to fourth pixels included in the repetition area become "L" as illustrated in part (A) of FIG. 5. Note that it is supposed that a gradation level based on the upper eight bit signals SP[9:2] is "L".

When the bit signal SP[1] is zero and the bit signal SP[0] is one, "1", "0", "0", and "0" are sequentially supplied to the addition unit 22b as pattern data items PD for the signals of the four pixels included in the repetition area. Accordingly, regarding an image based on the image signals DVd that are output from the addition unit 22b, as illustrated in part (B) of FIG. 5, the gradation level of the first pixel included in the repetition area becomes "L+1", and the gradation levels of the second to fourth pixels become "L".

When the bit signal SP[1] is one and the bit signal SP[0] is zero, "1", "0", "0", and "1" are sequentially supplied to the addition unit 22b as pattern data items PD for the signals of the four pixels included in the repetition area. Accordingly, regarding an image based on the image signals DVd that are output from the addition unit 22b, as illustrated in part (C) of FIG. 5, the gradation levels of the first and fourth pixels included in the repetition area become "L+1", and the gradation levels of the second and third pixels become "L".

When the bit signal SP[1] is one and the bit signal SP[0] is one, "1", "1", "1", and "0" are sequentially supplied to the addition unit 22b as pattern data items PD for the signals of the four pixels included in the repetition area. Accordingly, regarding an image based on the image signals DVd that are output from the addition unit 22b, as illustrated in part (D) of FIG. 5, the gradation levels of the first to third pixels included in the repetition area become "L+1", and the gradation level of the fourth pixel becomes "L".

Note that the pattern data items are not limited to the pattern data items that are illustrated in FIG. 6. For example, when the bit signal SP[1] is zero and the bit signal SP[0] is one, it is only necessary that one of the pattern data items listed in the tables TB1 to TB4 is "1". Furthermore, when the bit signal SP[1] is one and the bit signal SP[0] is zero, it is only necessary that two of the pattern data items listed in the tables TB1 to TB4 are "1". When the bit signal SP[1] is one and the bit signal SP[0] is one, it is only necessary that three of the pattern data items listed in the tables TB1 to TB4 are "1".

The image-signal processing devices 20-LU, 20-RU, 20-LL, and 20-RL illustrated in FIG. 1 individually perform multiple-gradation processing, with which enlargement of the image, conversion of the bit depth, and deterioration in the gradation that are described above can be compensated for, and output image signals DVd-LU, DVd-RU, DVd-LL, and DVd-RL, respectively, that have been processed.

The image signals that are output from the image-signal processing device 20 are supplied to the display section 30.

The display section 30 includes a display device 31, source drivers 32-LU, 32-RU, 32-LL, and 32-RL, gate drivers 33-LU, 33-RU, 33-LL, and 33-RL, and a gradation-voltage generating unit 34.

The image signals DVd-LU that are output from the image-signal processing device 20-LU are supplied to the source driver 32-LU. Furthermore, the image signals DVd-RU that are output from the image-signal processing device 20-RU and the image signals DVd-LL that are output from the image-signal processing device 20-LL are supplied to the source driver 32-RU and the source driver 32-LL, respectively. Moreover, the image signals DVd-RL that are output from the image-signal processing device 20-RL are supplied to the source driver 32-RL.

For example, a liquid-crystal display element is used for the display device 31. The liquid-crystal display element includes a substrate on which transparent pixel electrodes and thin film transistors (TFTs) are disposed, and a counter substrate over which one transparent electrode is formed. The liquid-crystal display element has a configuration in which liquid crystal is enclosed between the substrates. The TFTs having a switching function are controlled, thereby applying gradation voltages for realizing gradation in the pixels to the individual pixel electrodes. Accordingly, voltage differences are generated between the individual pixel electrodes and the corresponding electrodes formed on the counter substrate, thereby changing the transmittance of the liquid crystal to display an image.

The pixel electrodes of the display device 31 are disposed in a matrix form in the horizontal and vertical directions, and are connected to the TFTs. Furthermore, data lines for applying gradation voltages and scanning lines for applying control signals for causing the TFTs to perform a switching operation are connected to the TFTs. The display device 31 causes the TFTs to perform the switching operation in accordance with the control signals, thereby applying gradation voltages to the pixel electrodes. Accordingly, voltage differences are generated between the individual pixel electrodes and the corresponding electrodes formed on the counter substrate.

The source driver 32-LU performs serial parallel conversion on the image signals DVd-LU that are supplied from the image-signal processing device 20-LU to obtain display signals for the pixels arranged in each line in an area AR-LU of the display device 31. Additionally, the digital-to-analog (D/A) conversion and amplification are performed on the display signals to obtain analog gradation voltages. Here, in the D/A conversion that is performed on the display signals, a gradation reference voltage that is generated by the gradation-voltage generating unit 34 is selected. Then, a gradation voltage that is determined in correspondence with an image signal is generated by dividing the selected gradation reference voltage. In this manner, the source driver 32-LU generates gradation voltages for each of horizontal lines, and outputs the generated gradation voltages as drive signals via the data lines of the display device 31 to the TFTs in such a manner that the gradation voltages are sequentially selected for each of the horizontal lines.

The source drivers 32-RU, 32-LL, and 32-RL perform processes, each of which is similar to the process performed by the source driver 32-LU. The source drivers 32-RU, 32-LL, and 32-RL generate drive signals for the pixels arranged in each line in the areas AR-RU, AR-LL, and AR-RL on the basis of the image signals that are supplied from the image-signal processing devices 20-RU, 20-LL, and 20-RL, respectively. Note that operations of the source drivers 32-LU, 32-RU, 32-LL, and 32-RL are performed in accordance with the control signals CT that are supplied from the control section 40.

The gate driver 33-LU generates the control signals for causing the TFTs to perform the switching operation for each of the horizontal lines in the area AR-LU of the display device 31, and outputs the control signals via the scanning lines of the display device 31 to the TFTs. The gate drivers 33-RU, 33-LL, and 33-RL perform processes, each of which is similar to the process performed by the gate driver 33-LU. The gate drivers 33-RU, 33-LL, and 33-RL generate the control signals for causing the TFTs to perform the switching operation for each of the horizontal lines in the areas AR-RU, AR-LL, and AR-RL, respectively, and output the control signals via the scanning lines to the TFTs. Note that operations of the gate drivers 33-LU, 33-RU, 33-LL, and 33-RL are performed in accordance with the control signals CT that are supplied from the control section 40.

The gradation-voltage generating unit 34 generates the gradation reference voltage, and outputs the gradation reference voltage to the source drivers 32-LU, 32-RU, 32-LL, and 32-RL.

The control section 40 generates the control signals CT in synchronization with the image signals DVa representing the input image, and outputs the control signals CT to the image-signal processing device 20 and the display section 30. The control section 40 generates, as the control signals CT, timing signals, such as clock signals and synchronization signals, and signals for controlling writing and reading, which are performed by the frame memory 21a and the line memory 21b, of the image signals. Furthermore, the control section 40 generates, as the control signals CT, a horizontal start signal and a horizontal clock signal for driving the source drivers, a vertical start signal and a vertical clock signal for driving the gate drivers, and so forth.

2. Operation of Image-Signal Processing Device

Figure 7:
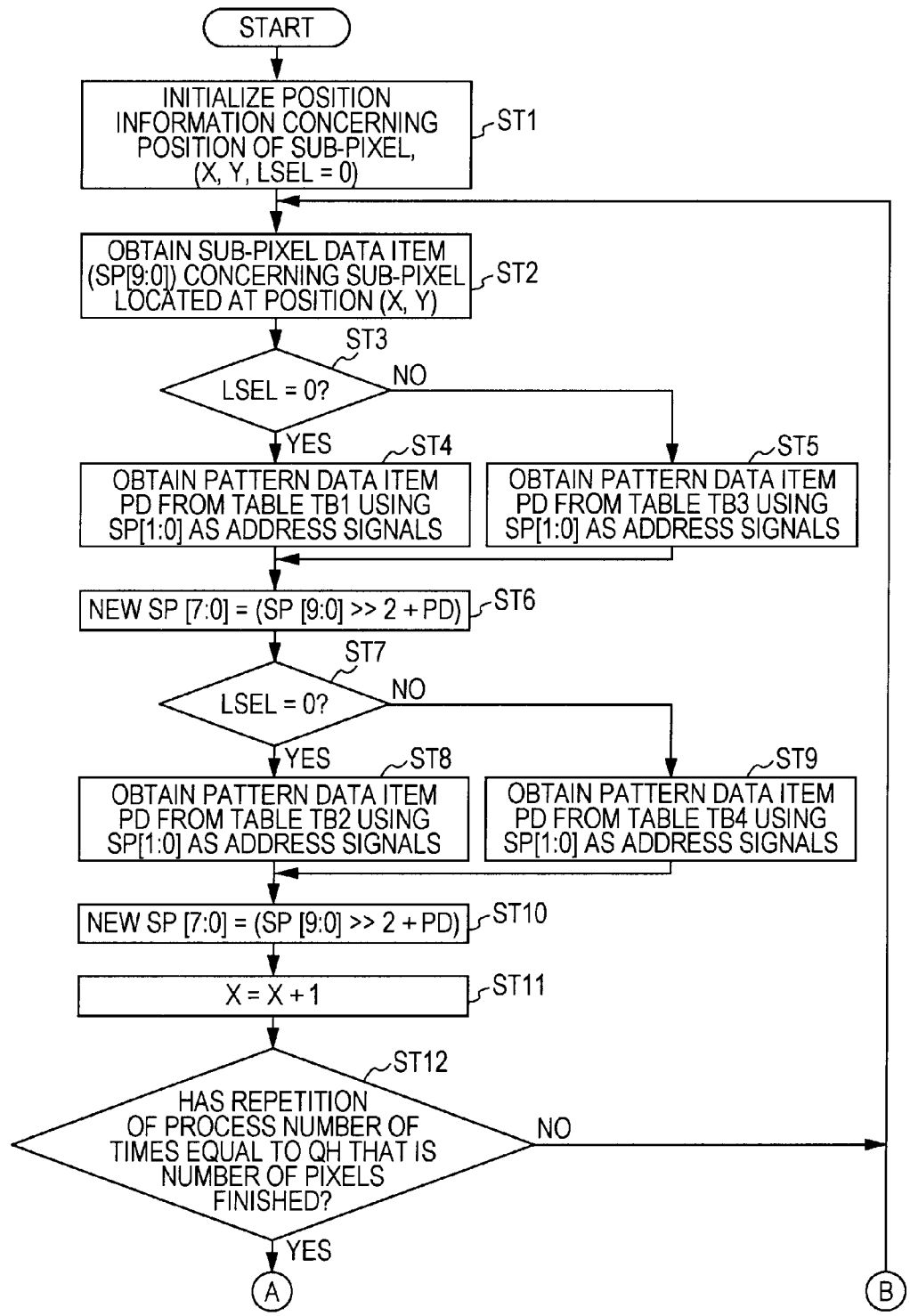
FIG. 7 is a first part of a flowchart of an operation of the image-signal processing device.
Figure 8:
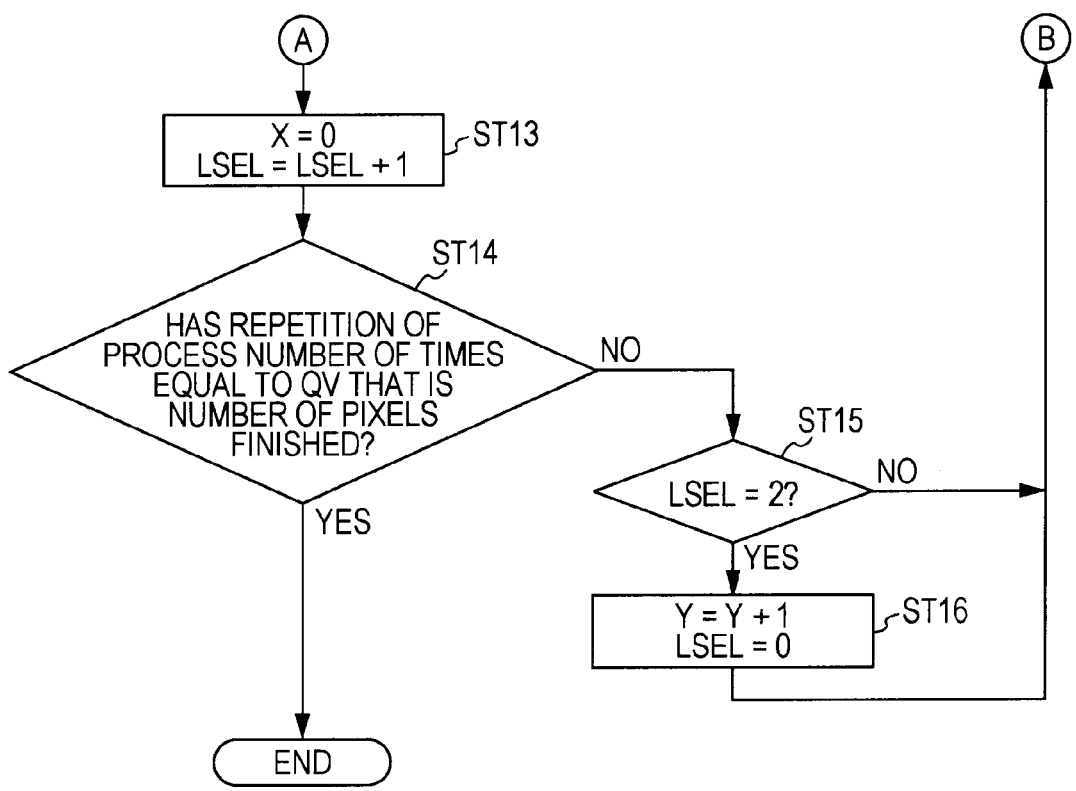
FIG. 8 is a second part of the flowchart of the operation of the image-signal processing device.

Next, an operation of the image-signal processing device will be described. FIGS. 7 and 8 are flowcharts illustrating an operation of the multiple-gradation processing section 22 included in the image-signal processing device. Note that the description given below is a description concerning the operation of the multiple-gradation processing section included in the image-signal processing device 20-LU.

In step ST1, the multiple-gradation processing section 22 initializes position information concerning the position of a sub-pixel. The multiple-gradation processing section 22 initializes the position information to set a position X of the sub-pixel in the horizontal direction and a position Y of the sub-pixel in the vertical direction to "0". Furthermore, the multiple-gradation processing section 22 sets line information LSEL that indicates repetition of a line to "0". Note that, regarding the sub-pixel, when one pixel is configured using red, green, and blue pixels, each of the red, green, and blue pixels corresponds to the sub-pixel. Furthermore, the line information LSEL is information with which the number of repetitions of a line in a case in which enlargement of an image is performed can be determined. For example, when an image is doubled in the vertical direction, each line is repeated twice. In this case, when one line is repeated for a first time, the line information LSEL is set to "0", and, when the line is repeated for a second time, the line information LSEL is set to "1".

In step ST2, the multiple-gradation processing section 22 obtains a sub-pixel data item concerning a sub-pixel that is located at the position (X, Y). A sub-pixel data item (the ten bit signals SP[9:0] corresponding to ten bits) concerning the sub-pixel that is located at the position (X, Y) is output from the line memory 21b, and the multiple-gradation processing section 22 obtains the sub-pixel data item. The multiple-gradation processing section 22 proceeds to step ST3.

In step ST3, the multiple-gradation processing section 22 determines whether or not the line information LSEL is "0". When the line information LSEL is "0", the multiple-gradation processing section 22 proceeds to step ST4. When repetition of a line is performed as described below and, then, the line information LSEL is no longer "0", the multiple-gradation processing section 22 proceeds to step ST5.

In step ST4, the multiple-gradation processing section 22 obtains a pattern data item PD from the table TB1 using, as address signals, the lower two bit signals SP[1:0] included in the sub-pixel data item. The multiple-gradation processing section 22 proceeds to step ST6.

In step ST5, the multiple-gradation processing section 22 obtains a pattern data item PD from the table TB3 using, as address signals, the lower two bit signals SP[1:0] included in the sub-pixel data item. The multiple-gradation processing section 22 proceeds to step ST6.

In step ST6, the multiple-gradation processing section 22 adds the pattern data item PD to the upper eight bit signals SP[9:2] that are obtained by removing the lower two bit signals SP[1:0] from the sub-pixel data item to generate new signals SP[7:0] so that the bit depth is eight bits. The multiple-gradation processing section 22 proceeds to step ST7.

In step ST7, the multiple-gradation processing section 22 determines whether or not the line information LSEL is "0". When the line information LSEL is "0", the multiple-gradation processing section 22 proceeds to step ST8. When repetition of the line is performed described below and, then, the line information LSEL is no longer "0", the multiple-gradation processing section 22 proceeds to step ST9.

In step ST8, the multiple-gradation processing section 22 obtains a pattern data item PD from the table TB2 using, as address signals, the lower two signals SP[1:0] included in the sub-pixel data item. The multiple-gradation processing section 22 proceeds to step ST10.

In step ST9, the multiple-gradation processing section 22 obtains a pattern data item PD from the table TB4 using, as address signals, the lower two bit signals SP[1:0] included in the sub-pixel data item. The multiple-gradation processing section 22 proceeds to step ST10.

In step ST10, the multiple-gradation processing section 22 adds the pattern data item PD to the upper eight bit signals SP[9:2] that are obtained by removing the lower two bit signals SP[1:0] from the sub-pixel data item to generate new signals SP[7:0] so that the bit depth is eight bits. The multiple-gradation processing section 22 proceeds to step ST11.

In step ST11, the multiple-gradation processing section 22 adds "1" to the position X of the sub-pixel in the horizontal direction to obtain a new position X. The multiple-gradation processing section 22 proceeds to step ST12.

In step ST12, the multiple-gradation processing section 22 determines whether or not repetition of a process a number of times that is equal to QH which is the number of pixels included in the quarter area in the horizontal direction has finished. When the position X is not located outside the quarter area, the multiple-gradation processing section 22 returns to step ST2. When the position X is located outside the quarter area, the multiple-gradation processing section 22 proceeds to step ST13 illustrated in FIG. 8.

In step ST13, the multiple-gradation processing section 22 performs initialization for the process that is to be performed on a second line which is obtained by repeating the line. In order to start performing the process on the second line, the multiple-gradation processing section 22 initializes the position X to set the position X to "0". Furthermore, in order that the multiple-gradation processing section 22 can recognize that the process is being performed on the second line, the multiple-gradation processing section 22 adds "1" to the line information LSEL to obtain new line information LSEL. The multiple-gradation processing section 22 proceeds to step ST14.

In step ST14, the multiple-gradation processing section 22 determines whether or not repetition of the process a number of times that is equal to QV which is the number of pixels included in the quarter area in the vertical direction has finished. When the position Y is not located outside the quarter area, the multiple-gradation processing section 22 proceeds to step ST15. When the position Y is located outside the quarter area, the multiple-gradation processing section 22 terminates the process that is performed for one frame image having the quarter area.

In step ST15, the multiple-gradation processing section 22 determines whether or not the line information LSEL is "2". When the line information LSEL is "2", the multiple-gradation processing section 22 proceeds to step ST16. When the line information LSEL has not become "2", the multiple-gradation processing section 22 returns to step ST2 illustrated in FIG. 7. Here, when performance of the process on the first line is completed, the line information LSEL is set to "1" by the process in step ST13. Furthermore, performance of the process on the second line that is obtained by repeating the line is completed, the line information LSEL is set to "2" by the process in step ST13. Accordingly, when the line information LSEL is "1", the multiple-gradation processing section 22 returns to step ST2, and the process is performed on the second line that is obtained by repeating the line. Moreover, when performance of the process on the second line that is obtained by repeating the line is completed and the line information LSEL is set to "2", the multiple-gradation processing section 22 proceeds to the step ST16.

In step ST16, the multiple-gradation processing section 22 adds "1" to the position Y of the sub-pixel in the vertical direction to obtain a new position Y. Furthermore, the multiple-gradation processing section 22 initializes the line information LSEL to set the line information LSEL to "0". The multiple-gradation processing section 22 returns to step ST2.

In this manner, for each of the pixels included in the repetition area that is obtained by repeating one pixel of the input image, a pattern data item that is determined in accordance with the lower two bit signals SP[1:0] of the corresponding image signal is added to the upper eight bit signals SP[9:2], whereby the image signal DVd-LU whose bit depth is eight bits can be generated.

Note that the multiple-gradation processing section included in each of the image-signal processing devices 20-RU, 20-LL, and 20-RL performs a process, which is similar to the process performed by the multiple-gradation processing section included in the image-signal processing device 20-LU, using the position of the first pixel in a corresponding one of the quarter areas as an initialization position. Accordingly, the image-signal processing devices 20-RU, 20-LL, and 20-RL can generate the images signals DVd-RU, DVd-LL and DVd-RL, respectively.

Figure 9:
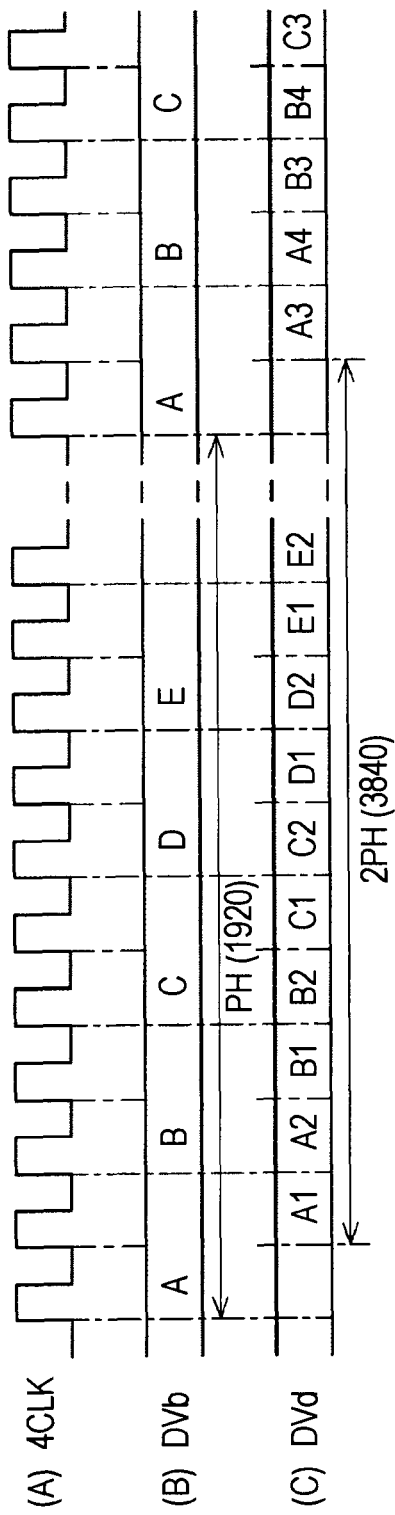
FIG. 9 includes diagrams for explaining an operation of the multiple-gradation processing section.

FIG. 9 illustrates the operation of the image-signal processing device. Part (A) of FIG. 9 illustrates a clock signal 4CLK. Part (B) of FIG. 9 illustrates the image signals DVb that are supplied from the line memory to the multiple-gradation processing section. Part (C) of FIG. 9 illustrates the image signals DVd that are output from the multiple-gradation processing section.

The image signals DVa representing the input image are stored in the line memory 21*b* on a line-by-line basis, and the image signals are read from the line memory 21*b* so that the number of pixels in the horizontal direction is doubled. The clock signal 4CLK has a frequency, for example, that is four times the frequency of a clock signal CLK indicating a timing at which the image signals DVa representing the input image are input. For each of the pixels, the multiple-gradation processing section 22 reads a corresponding one of the image signals twice from the line memory 21*b* in synchronization with the clock signal 4CLK, thereby generating image signals so that the number of pixels are doubled in the horizontal direction. Alternatively, the multiple-gradation processing section 22 may sequentially read the image signals from the line memory 21*b* at a frequency that is half the frequency of the clock signal 4CLK, may output pattern data items in synchronization with the clock signal 4CLK, and may generate the image signals DVd so that the number of pixels in the horizontal direction is doubled. Note that part (B) of FIG. 9 illustrates a case in which the multiple-gradation processing section 22 sequentially reads the image signals from the line memory 21*b* on a pixel-by-pixel basis at a frequency that is half the frequency of the clock signal 4CLK.

Furthermore, as illustrated part (B) of FIG. 9, when outputting of the image signals for one line from the line memory 21*b* is completed, outputting of the same image signals for one line is repeated, thereby generating image signals so that the number of pixels is doubled in the vertical direction.

In this manner, the image-enlargement processing section 21 reads the image signals from the line memory 21*b*. The image-enlargement processing section 21 performs mapping to obtain two pixels×two pixels, which are adjacent to one another in the enlarged image, from each of the pixels of the input image. The image-enlargement processing section 21 generates image signals representing an enlarged image in which the number of pixels is doubled in each of the horizontal and vertical directions.

The multiple-gradation processing section 22 performs multiple-gradation processing in synchronization with the clock signal 4CLK. For example, when the image signals for one line are read from the line memory 21*b* for a first time, the pattern-data output unit 22*a* uses, as address signals, the lower two bit signals SP[1:0], which have been read, of a pixel A. Furthermore, in synchronization with the clock signal 4CLK, the pattern-data output unit 22*a* selects pattern data items PD in accordance with the address signals from the tables TB1 and TB2, and sequentially outputs the pattern data items PD to the addition unit 22*b*. The addition unit 22*b* adds the pattern data items PD to the upper eight bit signals SP[9:2] of the pixel A to obtain new signals, and outputs the new signals as image signals of pixels A1 and A2 included in the repetition area. Additionally, the multiple-gradation processing section 22 also performs similar processes on a pixel B and pixels subsequent to the pixel B to generate image signals so that the number of the pixels in the horizontal direction is doubled.

Next, when the image signals for one line are read from the line memory 21*b* for a second time, the pattern-data output unit 22*a* uses, as address signals, the lower two bit signals SP[1:0], which have been read, of the pixel A. Furthermore, in synchronization with the clock signal 4CLK, the pattern-data output unit 22*a* selects pattern data items PD in accordance with the address signals from the tables TB3 and TB4, and sequentially outputs the pattern data items PD to the addition unit 22*b*. The addition unit 22*b* adds the pattern data items PD to the upper eight bit signals SP[9:2] of the pixel A to obtain new signals, and outputs the new signals as image signals of pixels A3 and A4 included in the repetition area. Additionally, the multiple-gradation processing section 22 also performs similar processes on the pixel B and the pixels subsequent to the pixel B to generate the image signals DVd so that the number of the pixels in each of the horizontal and vertical directions is doubled.

Figure 10:
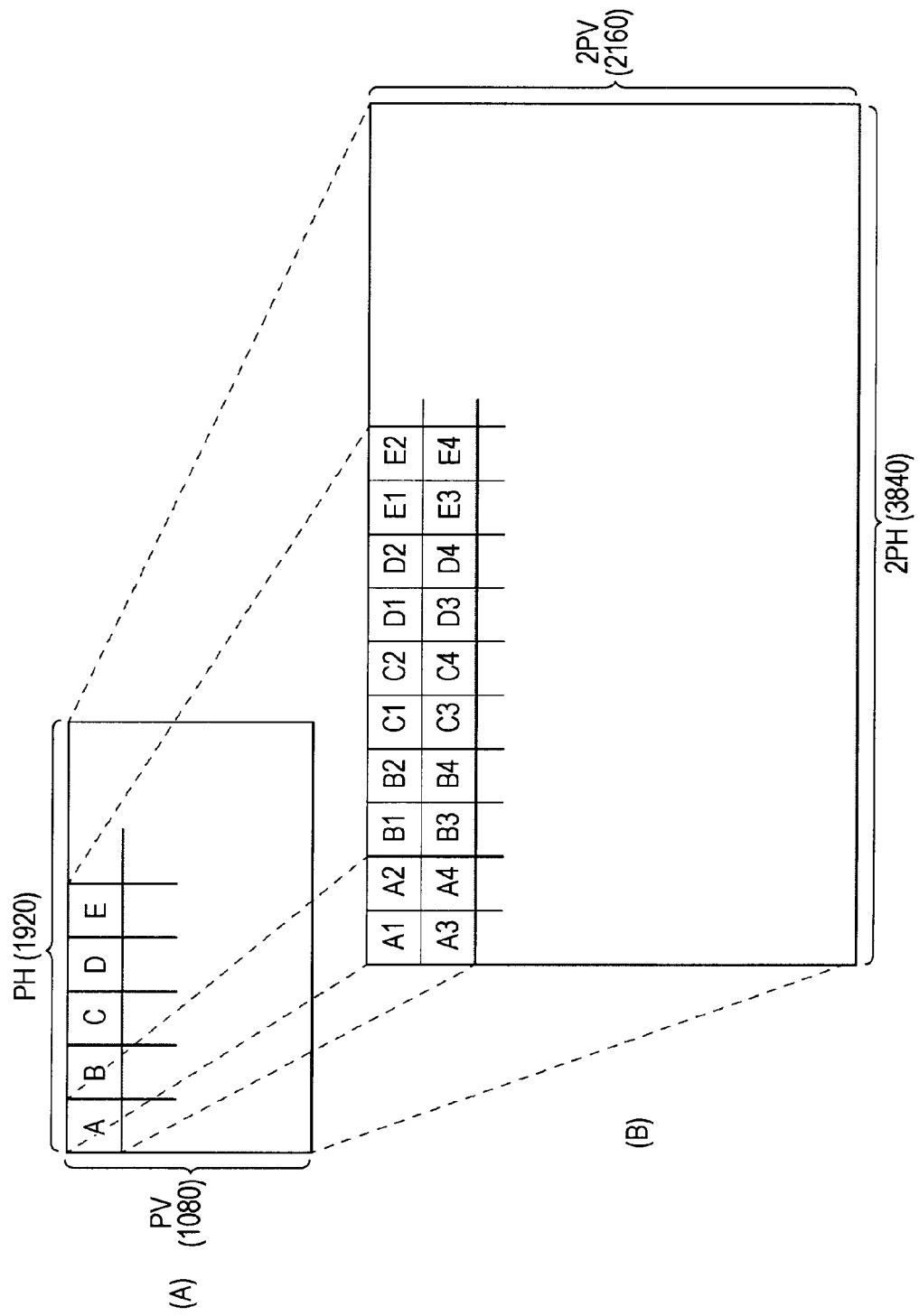
FIG. 10 includes diagrams for explaining the operation of the image-signal processing device.

When the above-described processes are performed on an image illustrated in part (A) of FIG. 10, an image in which the number of pixels is doubled in each of the horizontal and vertical directions is obtained as illustrated in part (B) of FIG. 10. Furthermore, one pixel of the input image is doubled in each of the horizontal and vertical directions to obtain four pixels of a display image. An area in which the four pixels are included is considered as the repetition area, and dithering is performed on each of the four pixels included in the repetition area. The image signals DVd, in which deterioration in the gradation that has been caused by reducing the bit depth from ten bits to eight bits is compensated for, can be generated. Accordingly, image display can be performed using a display device having a resolution that is higher than a resolution based on the image signals representing the input image. Even when this display device does not satisfy gradation characteristics suitable for the image signals representing the input image, wide gradation expression can be achieved.

Note that, in the above-described embodiment, when image display is performed in the 4K2K size of a display using image signals representing an input image having the HD size, a case is described, in which the input image is divided into four images and in which parallel processing is performed. However, the input image may be divided into two images, and parallel processing may be performed. Furthermore, when high-speed processing can be performed, processing may be performed without dividing the input image. Moreover, when division of the input image is performed, the division of the input image is not limited to division of the input image in each of the horizontal and vertical directions as illustrated in FIG. 2. For example, the input image may be divided only either in the horizontal direction or in the vertical direction.

Furthermore, in the pattern-data output unit 22*a* of the multiple-gradation processing section 22, different pattern data items may be stored as the pattern data items that are determined in accordance with the lower two bit signals SP[1:0], and the pattern data items may be output so that switching between the pattern data items is performed. Switching between the pattern data items may be performed in a spatial direction or in a time direction. Additionally, regarding switching between the pattern data items, randomly switching between the pattern data items is preferable.

For example, in parts (A) to (B) of FIG. 9, when the signal level of the pixel A and the signal level of the pixel B are equal to each other, switching between the pattern data items may be performed in the spatial direction. In this case, in a repetition area corresponding to the pixel A, "1" is added only to the upper eight bit signals SP[9:2] of the pixel A1. Furthermore, in a repetition area corresponding to the pixel B, "1" is added only to the upper eight bit signals SP[9:2] of one of the pixels B2 to B4 that are different from the pixel B1. In this manner, in an enlarged image, occurrence of a moire, beat noise, or the like because of regularity of pixels having the upper eight bit signals SP[9:2] that "1" has been added to can be prevented.

Furthermore, for example, in parts (A) to (B) of FIG. 9, when the signal level of the pixel A in a certain frame and the signal level of the pixel A in the next frame are equal to each other, switching between the pattern data items may be performed in the time direction. In this case, in a repetition area corresponding to the pixel A in the certain frame, "1" is added only to the upper eight bit signals SP[9:2] of the pixel A1. Furthermore, in a repetition area corresponding to the pixel A in the next frame, "1" is added only to the upper eight bit signals SP[9:2] of one of the pixels A2 to A4 that are different from the pixel A1. In this manner, when a moving image is enlarged and displayed, in the enlarged moving image, occurrence of a moire, beat noise, or the like because of regularity of pixels having the upper eight bit signals SP[9:2] that "1" has been added to can be prevented.

Moreover, a scheme for converting the bit depth and a scheme for enlarging an image are not limited to the schemes in the above-described embodiment. For example, when conversion of image signals into predetermined-number-of-bits image signals is performed, in a case in which the number of bits corresponding to signals that are obtained by removing signals corresponding to the predetermined number of upper bits from each of the image signals is m, the number of pixels included in a corresponding one of the repetition areas of an enlarged image is set to "$2^m$" or more. When an image is enlarged in this manner, error distribution is performed on the pixels included in the repetition area in accordance with the signals corresponding to m bits. Thus, deterioration in the gradation that has been caused by converting the image signals into the predetermined-number-of-bits image signals can be compensated for.

Additionally, when the number of pixels included in the repetition area is "$2^n$", a pattern data item is determined in accordance with signals corresponding to upper n bits that are included in the signals which are obtained by removing the signals corresponding to the predetermined number of upper bits from a corresponding one of the image signals. The pattern data item is output from a pattern-data output unit. When outputting of pattern data items is performed in this manner, error distribution can be performed in accordance with the number of pixels included in the repetition area. Thus, deterioration in the gradation that has been caused by converting the image signals into predetermined-number-of-bits image signals can be compensated for.

The series of processes described in the specification can be performed by hardware or software, or a configuration using a combination of hardware and software. In a case in which the processes are performed by software, a program in which a sequence of the processes is recorded can be installed into a memory provided in a computer incorporated in dedicated hardware, and can be executed. Alternatively, the program can be installed into a general-purpose computer capable of performing various processes, and can be executed.

For example, the program can be recorded in advance on a hard disk or a read-only memory (ROM) serving as a recording medium. Alternatively, the program can be stored (recorded) temporarily or permanently on a removable recording medium such as a flexible disc, a compact disc read only memory (CD-ROM), a magneto optical (MO) disc, a digital versatile disc (DVD), a magnetic disc, or a semiconductor memory. Such a removable recording medium can be provided as so-called packaged software.

Note that the program can be installed from a removable recording medium as described above into a computer. In addition, the program can be transferred wirelessly from a download site to a computer, or be transferred by wire to a computer via a network such as a local area network (LAN) or the Internet, and the computer can receive the program transferred in such a manner and install it into a built-in recording medium such as a hard disk.

The present application contains subject matter related to that disclosed in Japanese Priority Patent Application JP 2009-209039 filed in the Japan Patent Office on Sep. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image-signal processing device comprising:
   an image-enlargement processing unit configured to generate image signals representing an image that has been enlarged by repeating pixels;
   a pattern-data output unit configured to output, for each of repetition areas that are obtained by repeating the pixels, a pattern data item in accordance with signals that are obtained by removing signals corresponding to a predetermined number of upper bits from a corresponding one of the image signals, the pattern data item being used to reproduce, in the pixels included in the repetition area, gradation based on the signals that are obtained by removing the signals corresponding to the predetermined number of upper bits from the image signal; and
   an addition unit configured to add, for each of the repetition areas, the pattern data item to the signals corresponding to the predetermined number of upper bits included in a corresponding one of the image signals, wherein
   when the number of bits corresponding to the signals that are obtained by removing the signals corresponding to the predetermined number of upper bits from the image signal is set to m, the number of pixels included in the repetition area is "$2m$" or more.

2. An image-signal processing device comprising:
   an image-enlargement processing unit configured to generate image signals representing an image that has been enlarged by repeating pixels;
   a pattern-data output unit configured to output, for each of repetition areas that are obtained by repeating the pixels, a pattern data item in accordance with signals that are obtained by removing signals corresponding to a predetermined number of upper bits from a corresponding one of the image signals, the pattern data item being used to reproduce, in the pixels included in the repetition area, gradation based on the signals that are obtained by removing the signals corresponding to the predetermined number of upper bits from the image signal; and
   an addition unit configured to add, for each of the repetition areas, the pattern data item to the signals corresponding to the predetermined number of upper bits included in a corresponding one of the image signals, wherein when the number of pixels included in the repetition area is "$2n$", the pattern data is output in accordance with signals corresponding to upper n bits that are included in the signals which are obtained by removing the signals corresponding to the predetermined number of upper bits from the image signal.

3. An image-signal processing method comprising the steps of:
   generating, with an image-enlargement processing unit, image signals representing an image that has been enlarged by repeating pixels;
   outputting, with a pattern-data output unit, for each of repetition areas that are obtained by repeating the pixels, a pattern data item in accordance with signals that are obtained by removing signals corresponding to a predetermined number of upper bits from a corresponding one of the image signals, the pattern data item being used to reproduce, in the pixels included in the repetition area, gradation based on the signals that are obtained by removing the signals corresponding to the predetermined number of upper bits from the image signal; and adding, with an addition unit, for each of the repetition areas, the pattern data item to the signals corresponding to the predetermined number of upper bits included in a corresponding one of the image signals, wherein when the number of bits corresponding to the signals that are obtained by removing the signals corresponding to the predetermined number of upper bits from the image signal is set to m, the number of pixels included in the repetition area is "2m" or more.

4. The image-signal processing device according to claim 1, wherein the pattern-data output unit stores each of pattern data items different from each other as the pattern data item that is to be output in accordance with the signals which are obtained by removing the signals corresponding to the predetermined number of upper bits from the image signal, switches between the pattern data items different from each other, and outputs the pattern data item.

5. The image-signal processing device according to claim 4, wherein the pattern-data output unit performs the switching between the pattern data items in a spatial direction.

6. The image-signal processing device according to claim 4, wherein the pattern-data output unit performs the switching between the pattern data items in a time direction.

7. The image-signal processing device according to claim 1, wherein the pattern-data output unit has a table for each of the pixels included in the repetition area, selects the pattern data item from the table in accordance with the signals that are obtained by removing the signals corresponding to the predetermined number of upper bits from the image signal, and outputs the pattern data item.

* * * * *